(12) United States Patent
Fey et al.

(10) Patent No.: US 6,521,350 B2
(45) Date of Patent: Feb. 18, 2003

(54) APPLICATION AND MANUFACTURING METHOD FOR A CERAMIC TO METAL SEAL

(75) Inventors: Kate E. Fey, Valencia, CA (US); Guangqiang Jiang, Castaic, CA (US)

(73) Assignee: Alfred E. Mann Foundation for Scientific Research, Valencia, CA (US)

( * ) Notice: Subject to any disclaimer, the term of this patent is extended or adjusted under 35 U.S.C. 154(b) by 0 days.

(21) Appl. No.: 09/972,280

(22) Filed: Oct. 6, 2001

(65) Prior Publication Data
US 2002/0192481 A1 Dec. 19, 2002

Related U.S. Application Data
(60) Provisional application No. 60/299,376, filed on Jun. 18, 2001.

(51) Int. Cl.$^7$ ............................................. B32B 15/04
(52) U.S. Cl. ................. 428/472; 228/122.1; 228/124.1; 228/124.5; 228/124.6; 428/336; 428/629
(58) Field of Search .................... 428/472, 336, 428/629; 228/122, 122.1, 124.1, 124.5, 124.6

(56) References Cited

U.S. PATENT DOCUMENTS

| | | | |
|---|---|---|---|
| 3,594,895 A | 7/1971 | Hill | |
| 3,994,430 A | 11/1976 | Cusano et al. | |
| 5,013,612 A | * | 5/1991 | Hunt et al. |
| 5,870,272 A | * | 2/1999 | Seifried et al. ............. 361/302 |
| 6,221,513 B1 | 4/2001 | Lasater | |

* cited by examiner

Primary Examiner—Cynthia H. Kelly
Assistant Examiner—Tamra L. Dicus
(74) Attorney, Agent, or Firm—Gary D. Schnittgrun

(57) ABSTRACT

The invention is a method of bonding a ceramic part to a metal part by heating a component assembly comprised of the metal part, the ceramic part, and a very thin essentially pure interlayer material of a compatible interlayer material placed between the two parts and heated at a temperature that is greater than the temperature of the eutectic formed between the metal part and the metal interlayer material, but that is less than the melting point of either the interlayer material, the ceramic part or the metal part. The component assembly is held in intimate contact at temperature in a non-reactive atmosphere for a sufficient time to develop a homogeneous and strong bond between the ceramic part and the metal part. The bonded component assembly is optionally treated with acid to remove any residual free nickel and nickel salts, to assure a biocompatible component assembly for implantation in living tissue.

8 Claims, 2 Drawing Sheets

APPLICATION AND MANUFACTURING METHOD FOR A CERAMIC TO METAL SEAL

This application claims the benefit of U.S. Provisional application No. 60/299,376, filed Jun. 18, 2001.

FIELD OF THE INVENTION

This invention relates to a method of producing a hermetically sealed ceramic to metal bond for implantation in living tissue.

BACKGROUND OF THE INVENTION

Known methods of bonding a ceramic to a metal involve the use of interlayer materials which either melt at the bonding temperature, such as a braze, or which involve special coating processes for the material surfaces to be bonded, such as pre-coating the surfaces with an activating material. In some methods of bonding, an interlayer material having a composition that approximates the composition of the initial metal bonding surface is utilized, such as disclosed by Lasater (U.S. Pat. No. 6,221,513 B1). Lasater describes a method for forming a hermetically sealed bond for use in implantable medical devices. Hill (U.S. Pat. No. 3,594,895) described another approach to forming a ceramic to metal seal.

Cusano (U.S. Pat. No. 3,994,430) disclosed a method of directly bonding metal to ceramic substrates wherein a very thin layer of an interlayer material is placed between the metal and the ceramic to be bonded. The system is heated in an inert atmosphere to a temperature between the eutectic temperature of the interlayer material and the melting point of the metal. Cusano focused on bonding copper to a ceramic substrate, such as alumina or beryllia.

SUMMARY OF THE INVENTION

The present invention relates in general to the art of diffusion bonding in a non-reactive atmosphere, a flat ceramic rod end to an approximately matching flat metal rod end, particularly an yttria-stabilized zirconia rod to a titanium alloy rod, including the alloy Ti-6 Al-4 V, in order to produce a hermetic seal between the metal and the ceramic for use in living tissue, especially an animal body.

A very thin, approximately 0.001 inch thick or less, interlayer material of specific composition, typically essentially pure nickel or a pure nickel alloy, is placed between the surfaces of the parts to be bonded, the parts are yttria-stabilized zirconia and a titanium alloy. The assembly, with the surfaces held together at stress sufficient to cause intimate contact between the parts, is heated to the bonding temperature, between approximately 1728° and 1800° F., where the interlayer material and the metal surface exchange atoms in a solid state diffusion process involving little or no volume change. The joint isothermally solidifies in a short period of time, on the order of approximately 5 minutes, depending on the exact temperature, bonding stress, and configuration. The initial bond strengthens with additional time at temperature or with subsequent heat treatment, and is fully developed in approximately 15 minutes or less at temperature.

The bonding temperature is less than the melting point of any of the materials being bonded and is approximately equal to or slightly greater than the temperature of the eutectic formed between the interlayer material and the metal part.

This invention eliminates problems of the prior inventions. For example, because there is no melting of the interlayer material, there is little or no flow of the interlayer material out of the joint as "flash". In known methods, the flash must be removed in a post-bonding process. Further, the flash often bonds to the furnace hardware during thermal processing, making removal of the finished part difficult. This invention relies on solid state bonding and diffusion and does not involve melting of the interlayer material per se, thus allowing the original pre-bond dimensions to be preserved during the bonding process.

The bonding process takes place in a non-reactive atmosphere, such as in a vacuum or in an inert gas, such as argon, while the metal and ceramic parts being bonded are held together with a pressure that is sufficient to maintain intimate contact of the parts.

The resulting component assembly that comprises the metal, ceramic, and the metal-to-ceramic bond is biocompatible with living tissue when implanted in an animal body. The component assembly resists electrolytic corrosion and crevice corrosion.

The bonded component assembly may be subjected to an acid etch to eliminate any free nickel or nickel salts that remain a part of the component assembly, although the nickel is generally completely tied up as an integral part of the completed component assembly. Nickel and nickel salts are harmful to living tissue.

These and other features, aspects and advantages of the present invention will become better understood with reference to the following drawings, description and claims.

OBJECTS OF THE INVENTION

It is an object of the invention to provide a component assembly having a strong bond between a ceramic and a metal part that is biocompatible and resists electrolytic corrosion when implanted in living tissue.

It is an object of the invention to provide a strong bond between a ceramic, such as yttria-stabilized zirconia, and metal, such as a titanium alloy.

It is an object of the invention to provide a hermetic seal between a ceramic, such as yttria-stabilized zirconia, and metal, such as a titanium alloy.

It is an object of the invention to provide a method of bonding a ceramic to a metal for implantation in living tissue.

It is an object of the invention to provide a method of bonding a ceramic to a metal where there is no dimensional change in the joint during thermal development of the bond.

It is an object of the invention to provide a method of bonding a ceramic to a metal where there is no flow of the interlayer bonding material from the joint during thermal processing.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
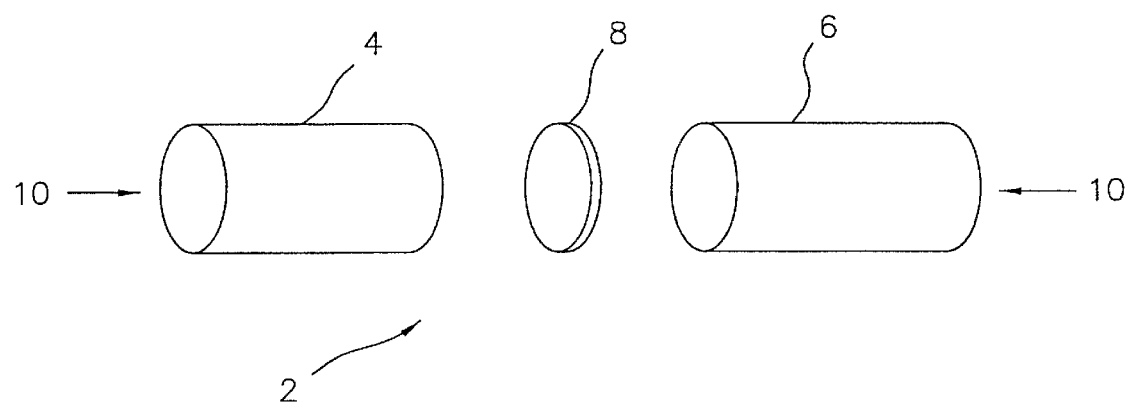
FIG. 1 illustrates the side view of the component assembly with the interlayer material as a foil between the ceramic and metal parts.

FIG. 1 shows component assembly 2 having metal part 4, ceramic part 6, and interlayer material 8. Component assembly 2 is heated to a specific process temperature, that is below the melting point of metal part 4, for a specific period of time, at a pressure that is created by force 10 and that is exerted so as to place interlayer material 8 in intimate contact with the metal and ceramic parts.

Interlayer material 8 is a foil having a thickness of less than one-thousandth of an inch. Interlayer material 8 is selected from the group of materials that are compatible with the ceramic chosen for ceramic part 6 in that they wet the surface during the bonding process and enter into a diffusion process with the ceramic part 6 thereby creating a strong bond joint during processing. Interlayer material 8 also is selected from the group of materials that are compatible with the metal chosen for metal part 4. Interlayer material 8 forms a bond with a metal part 4 by virtue of developing a eutectic alloy at the bonding temperature and pressure utilized during processing. The eutectic alloy formed during processing is predominantly composed of the metal selected for metal part 4. The group of interlayer materials includes essentially pure nickel, i.e., pure nickel and nickel containing approximately two percent or less by weight of alloy metals. In a preferred embodiment, interlayer material 8 is commercially pure nickel foil having at least 99.0% nickel and less than 1.0% of other elements with a thickness of approximately 0.0007 inches.

Metal part 4 may be a biocompatible material such as a titanium alloy, and is Ti-6 Al-4 V in a preferred embodiment. Ceramic part 6 may be alumina, titania, zirconia, stabilized-zirconia, partially-stabilized zirconia, tetragonal zirconia, magnesia-stabilized zirconia, ceria-stabilized zirconia, yttria-stabilized zirconia, and calcia-stabilized zirconia, and in a preferred embodiment ceramic part 6 is yttria-stabilized zirconia. In alternative embodiments, rather than using interlayer material 8 as a foil, interlayer material 8 may be a thin coating that is applied to either the metal part 4 or ceramic part 6 surface to be bonded by any of a variety of chemical processes such as electroless plating and electroplating, or by any of a variety of thermal processes such as sputtering, evaporating, or ion beam enhanced deposition. Interlayer material 8 may also be applied as a thin coating of metallic beads or metallic powder.

Figure 2:
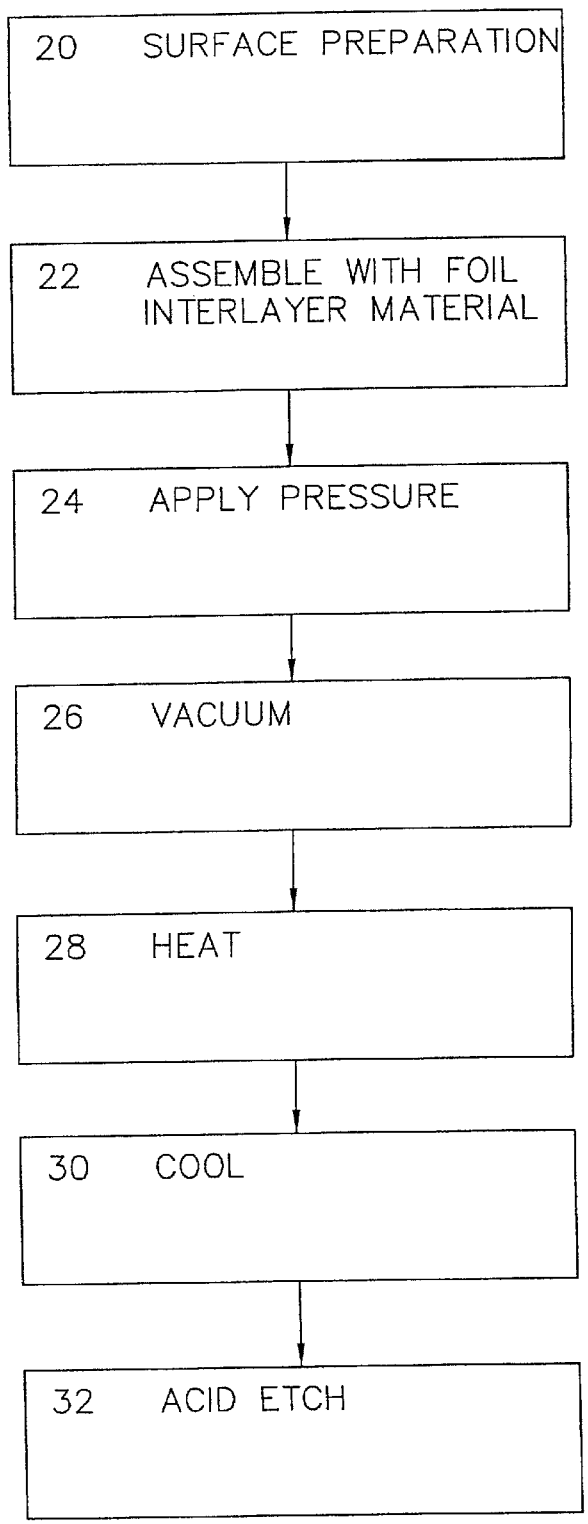
FIG. 2 schematically depicts the bonding steps of the present invention.

The process steps that are employed to create assembly 2 with a strong bond between metal part 4 and ceramic part 6 are schematically represented in FIG. 2. First, the surfaces to be bonded are prepared in step 20 by machining to assure that they will intimately conform to each other during bonding. The surfaces are smoothed and cleaned.

In step 22, component assembly 2 is prepared with interlayer material 8 between metal part 4 and ceramic part 6. In step 24, force 10 is applied to compress interlayer material 8 between metal part 4 and ceramic part 6. Force 10 is sufficient to create intimate contact between the parts. Force 10 is applied to assure that a homogeneous bond is formed between metal part 4 and ceramic part 6 thus creating a hermetic seal between the two parts.

In step 26 the assembly to be heat processed is placed in a furnace in a non-reactive atmosphere, which is preferably vacuum, but which can be argon in an alternative embodiment. A vacuum is applied before the furnace is heated to the processing temperature in step 28. A preliminary holding temperature may be used to allow the thermal mass of the parts to achieve equilibrium before proceeding with heating. The process temperature is lower than the melting point of metal part 4, but greater than the temperature of the eutectic formed between metal 4 and interlayer material 8. In a preferred embodiment, the vacuum is $10^{-6}$ to $10^{-7}$ torr, to assure that the interlayer material 8 and metal part 4 do not oxidize. Component assembly 2 is held at the selected temperature, which is typically between approximately 1728° and 1800° F., for approximately 5 to 20 minutes, while force 10 continues to be exerted on interlayer material 8. The exact time, temperature and pressure are variable with each other so as to achieve a homogeneous and strong bond of metal part 4 with ceramic part 6. For example, in a preferred embodiment, an yttria-stabilized zirconia part is bonded to a Ti-6 Al-4 V part in vacuum at $10^{-6}$ torr at approximately 1800° F. for 10 minutes with a pressure of approximately 5 to 20 psi on a commercially pure nickel foil of approximately 0.0007 inches thickness.

The furnace is cooled and component assembly 2 is cooled to room temperature in step 30. In optional step 32, component assembly 2 is cleaned by being placed in a bath, after thermal processing is complete, to assure removal of all nickel and nickel salts. This bath is preferably an acid bath that etches the exposed surfaces of component assembly 2. In a preferred embodiment, the bath is nitric acid. Removal of nickel and nickel salts in the bath etch insures that component assembly 2 is biocompatible. Nickel and nickel salts are detrimental to living animal tissue. In the preferred embodiment, however, all of the nickel that is introduced as interlayer material 8 is combined with the titanium and is tied up to be unavailable as free nickel or as a nickel salt.

Component assembly 2 is biocompatible after bonding and processing. Metal part 4, ceramic part 6, and interlayer material 8 are selected so as to be compatible with the environment in a living body. Hence, metal part 4 is typically a titanium alloy and ceramic part 6 is typically zirconia.

In a preferred embodiment, component assembly 2 is either an electrical sensor or an electrical stimulator that is implanted in a human body, although it could equally well be implanted in any animal. It must survive long periods in the hostile environment of a living body, which is basically a warm saline solution. In a preferred embodiment, component assembly 2 is either a sensor or stimulator comprised of a hollow ceramic tube that contains various electronic components that is bonded to a metal electrode end. The component assembly must be watertight; hence, the bond is hermetic, resisting salt-water intrusion as well as growth of living tissue into the metal-to-ceramic bond joint.

Further, component assembly 2 does not corrode while implanted in the body. The materials are chosen such that post-bonding they are not susceptible to corrosion either individually or in the as-bonded state. Component assembly 2 resists electrolytic corrosion as well as crevice corrosion, because of the materials selected for component assembly 2.

Obviously, many modifications and variations of the present invention are possible in light of the above teachings. It is therefore to be understood that, within the scope of the appended claims, the invention may be practiced otherwise than as specifically described.

What is claimed is:

1. A component assembly for use in living tissue comprising:
   a ceramic part;
   a metal part; and
   a pure nickel interlayer for bonding said ceramic part to said metal part.

2. The component assembly of claim 1 wherein
   said ceramic part is selected from the group consisting of alumina, titania, zirconia, stabilized-zirconia, partially-stabilized zirconia, tetragonal zirconia, magnesia-stabilized zirconia, ceria-stabilized zirconia, yttria-stabilized zirconia, calcia-stabilized zirconia, and yttria-stabilized zirconia.

3. The component assembly of claim 1 wherein
said metal part is selected from the group consisting of titanium and titanium alloys.

4. The component assembly of claim 1 wherein
said interlayer material reacts with and forms a eutectic bond between said metal part and said ceramic part.

5. The component assembly of claim 1 wherein:
said pure interlayer having a thickness of approximately 0.001 inches or less; and
said component assembly is heated to a temperature that is less than the melting point of said metal part or of said pure nickel interlayer, but that is greater than the eutectic melting point, thereby forming a bond.

6. The component assembly of claim 1 wherein
said pure interlayer material is a thin coating of essentially pure nickel that is applied to the surfaces that are to be bonded of either said metal part or said ceramic part, by a chemical process selected from the group consisting of electroless plating and electroplating.

7. The component assembly of claim 1 wherein
said pure interlayer material is a thin coating of essentially pure nickel that is applied to the surfaces that are to be bonded of either said metal part or said ceramic part, by a thermal process selected from the group consisting of sputtering, evaporating, and ion beam enhanced deposition.

8. The component assembly of claim 1 wherein
said essentially pure interlayer material is a thin coating of essentially pure nickel that is applied to the surfaces that are to be bonded of either said metal part or said ceramic part, selected from the group consisting of metallic beads and metallic powder.

* * * * *